US012254237B2

(12) United States Patent
Arai

(10) Patent No.: US 12,254,237 B2
(45) Date of Patent: Mar. 18, 2025

(54) OUTPUT DRIVER AND DISPLAY DEVICE

(71) Applicant: LAPIS Technology Co., Ltd., Yokohama (JP)

(72) Inventor: Mitsuru Arai, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/413,046

(22) Filed: Jan. 16, 2024

(65) Prior Publication Data

US 2024/0256212 A1    Aug. 1, 2024

(30) Foreign Application Priority Data

Jan. 31, 2023  (JP) ................................ 2023-013007

(51) Int. Cl.
  *G06F 3/147*   (2006.01)
  *G09G 3/20*    (2006.01)
  *G09G 3/36*    (2006.01)

(52) U.S. Cl.
  CPC .......... *G06F 3/147* (2013.01); *G09G 3/2096* (2013.01); *G09G 3/3688* (2013.01); *G09G 2310/0272* (2013.01); *G09G 2310/0291* (2013.01); *G09G 2310/066* (2013.01); *G09G 2310/08* (2013.01); *G09G 2370/14* (2013.01)

(58) Field of Classification Search
  CPC .... G06F 3/147; G09G 3/2096; G09G 3/3688; G09G 2310/0272; G09G 2310/0291; G09G 2310/066; G09G 2310/08; G09G 2370/14
  See application file for complete search history.

(56) References Cited

U.S. PATENT DOCUMENTS

| | | | |
|---|---|---|---|
| 6,281,715 B1* | 8/2001 | DeClue | H03K 19/018528 327/108 |
| 7,012,450 B1* | 3/2006 | Oner | H04L 25/0276 326/86 |
| 2004/0124888 A1* | 7/2004 | Radelinow | H04L 25/0282 327/65 |
| 2009/0045852 A1* | 2/2009 | Agarwal | H03K 19/018528 327/108 |
| 2021/0049956 A1* | 2/2021 | Yeh | G09G 5/008 |
| 2021/0152399 A1* | 5/2021 | Hsieh | H04L 25/0288 |

FOREIGN PATENT DOCUMENTS

JP   2018085713   5/2018

* cited by examiner

*Primary Examiner* — Hong Zhou

(74) *Attorney, Agent, or Firm* — JCIPRNET

(57) ABSTRACT

An output driver according to the disclosure includes a differential signaling circuit that includes a first transistor that generates a bias current, first and second nodes, and a resistor circuit connected between the first and second nodes, and outputs voltages respectively at the first and second nodes as a pair of differential signals by supplying the bias current to one of the first and second nodes based on a level of the input signals, a differential voltage circuit that supplies a differential voltage representing a difference between a center voltage of voltages between the first node and the second node and a predetermined reference voltage to a gate of the first transistor; and a pre-emphasis circuit that executes a pre-emphasis processing in response to changes in the level of the input signal, generating a current based on the differential voltage and adding it to the bias current.

5 Claims, 5 Drawing Sheets

OUTPUT DRIVER AND DISPLAY DEVICE

CROSS-REFERENCE TO RELATED APPLICATION

This application claims the priority benefits of Japanese application no. 2023-013007, filed on Jan. 31, 2023. The entity of the above-described patent application is hereby incorporated by reference herein and made a part of this specification.

BACKGROUND

Technical Field

The disclosure relates to an output driver that outputs differential signals, and a display device that includes the output driver.

Related Art

In recent years, a liquid crystal display device that employs a LVDS (Low Voltage Differential Signaling) method, which transmits data signals in the form of small-amplitude serial differential signals for data communication between a liquid crystal display panel and a display controller has been commercialized.

An output driver that employs the LVDS method defines a predetermined common mode voltage, and generates and outputs two systems of signals as differential signals that swing to the positive side and negative side, respectively, with the common mode voltage as a center voltage. Moreover, since the common mode voltage is generated based on the voltage generated in a resistor provided as a replica of a terminating resistor of the LVDS driver, the amplitude of the output differential signal fluctuates due to manufacturing variations in the resistor.

Thus, an LVDS driver has been proposed (for example, see Patent Literature 1: JP2018-85713A) to maintain the common mode voltage at a desired voltage value by controlling the bias current flowing to the LVDS driver by the difference between a reference voltage having a voltage value of a desired common mode voltage and a voltage actually generated in the resistor.

However, in recent years, with the trend toward higher definition images in liquid crystal display devices, there has been a demand for faster data communication between the liquid crystal display panel and the display controller.

Thus, disclosure provides an output driver capable of outputting differential signals at a high slew rate, and a display device including the output driver.

SUMMARY

An output driver according to the disclosure makes a binary input signal into differential signal and outputs the same. The output driver includes: a differential signaling circuit that includes a first transistor that generates a bias current, a first node and a second node, and a resistor circuit connected between the first node and second node, and outputs voltages generated respectively at the first node and the second node as a pair of differential signals by supplying the bias current to one of the first node and the second node based on a level of the input signal; a differential voltage circuit that supplies a differential voltage representing a difference between a center voltage of voltages between the first node and the second node and a predetermined reference voltage to a gate of the first transistor; and a pre-emphasis circuit that executes a pre-emphasis processing in response to changes in the level of the input signal, generating a current based on the differential voltage and adding it to the bias current.

Further, an output driver according to the disclosure includes a clock driver part that makes a clock signal into differential signal and outputs the same, and a data driver part that makes a data signal into differential signal and outputs the same. The clock driver part includes: a first differential signaling circuit that includes a first transistor that generates a first bias current, a first node and a second node, a first resistor with one end connected to the first node, and a second resistor with one end connected to the second node and the other end connected to the other end of the first resistor, and outputs voltages generated respectively at the first node and the second node as a pair of differential clock signals by supplying the first bias current to one of the first node and the second node based on a level of the clock signal; a first operational amplifier that takes a voltage generated at the other end of the first resistor as a first center voltage indicating a center voltage of the pair of differential clock signals, and supplies a differential voltage representing a difference between the first center voltage and a predetermined reference voltage to a gate of the first transistor; a second operational amplifier that generates a first differential voltage representing a difference between the first center voltage and the reference voltage; and a first pre-emphasis circuit that executes a pre-emphasis processing in response to changes in a level of the clock signal, generating a current based on the first differential voltage and adding it to the first bias current. The data driver part includes: a second differential signaling circuit that includes: a second transistor that generates a second bias current, third and fourth nodes, a third resistor with one end connect to the third node, and a fourth resistor with one end connected to the fourth node and the other end connected to the other end of the third resistor, and outputs voltages generated respectively at the third and fourth nodes as a pair of differential data signals by supplying the second bias current to one of the third and fourth nodes based on the level of the data signal; a third operational amplifier that takes a voltage generated at the other end of the third resistor as a second center voltage indicating a center voltage of the pair of differential data signals, and supplies a differential voltage representing a difference between the second center voltage and the reference voltage to a gate of the second transistor; and a second pre-emphasis circuit that executes a pre-emphasis processing in response to changes in a level of the data signal, generating a current based on the first differential voltage and adding it to the second bias current.

A display device according to the disclosure includes: a display panel including multiple data lines for image display; a display control unit that receives a video signal, generates a pair of differential data signals obtained by making a series of pixel data pieces representing a luminance level of each pixel into differential signal based on the video signal and each including a pair of differential signals, and a pair of differential clock signals obtained by making a clock signal into differential signal, and outputs them respectively; and a data driver that receives the pair of differential data signals and the pair of differential clock signals, generates multiple driving signals based on the pair of differential data signals and the pair of differential clock signals, and supplies them to the multiple data lines of the display panel. The display control unit generates the pair of differential clock signals by the clock driver part, and generates the pair of differential data signals by the data driver part.

DESCRIPTION OF THE EMBODIMENTS

In the output driver according to the disclosure, a bias current flowing in a differential signaling circuit, which generates a pair of differential signals obtained by making a binary input signal into differential signal, is controlled based on a differential voltage representing the difference between a center voltage of the pair of differential signals and a reference voltage. Further, a pre-emphasis processing is executed in response to changes in a level of an input signal, generating a current based on the differential voltage as a pre-emphasis current and adding it to the bias current.

Thus, according to the disclosure, a current value of the bias current flowing in the differential signaling circuit is increased by the pre-emphasis processing, such that a high slew rate of the output driver can be achieved.

Embodiment 1

Figure 1:
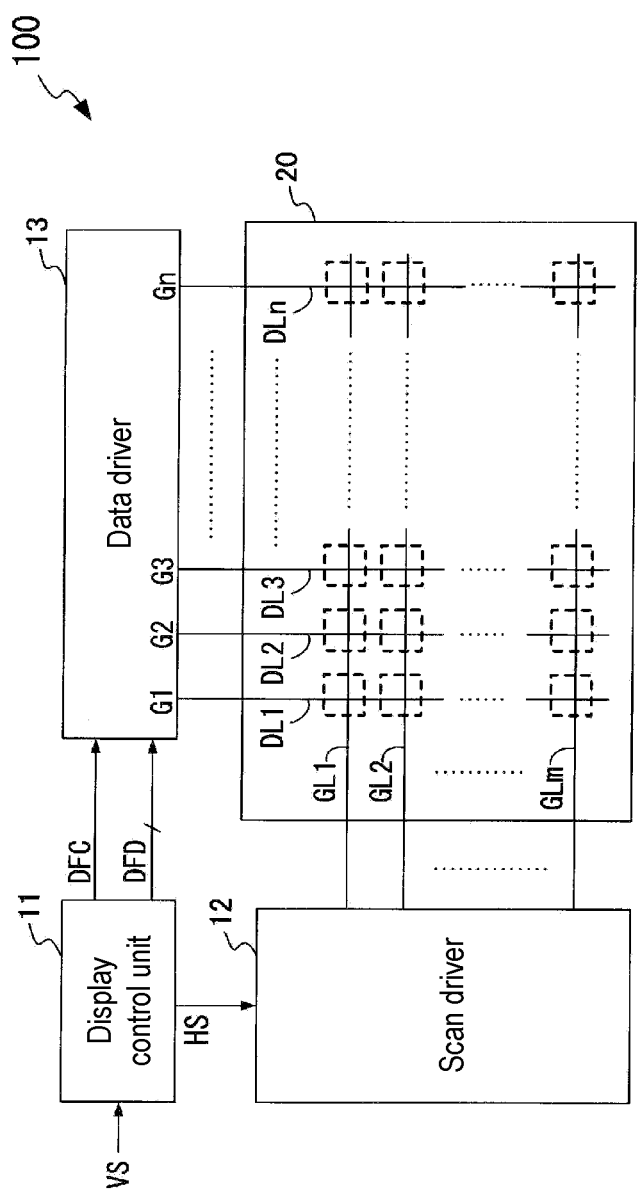
FIG. 1 is a block diagram showing a schematic configuration of a display device 100 including an output driver according to the disclosure.

FIG. 1 is a block diagram showing a schematic configuration of a display device 100 including an output driver according to the disclosure.

As shown in FIG. 1, the display device 100 includes a display control unit 11, a scan driver 12, a data driver 13, and a display panel 20 that includes a liquid crystal panel or the like.

The display panel 20 is formed with m (m is a natural number greater than or equal to 2) scan lines GL1 to GLm each extending in the horizontal direction of a two-dimensional screen, and n (n is a natural number greater than or equal to 2) data lines DL1 to DLn each extending in the vertical direction of the two-dimensional screen. Further, display cells serving as pixels are formed in each intersection region of the scan line and the data line.

The display control unit 11 receives a video signal VS, generates a horizontal scan signal HS indicating horizontal scan timing for each horizontal synchronization signal included in the video signal VS, and supplies it to the scan driver 12.

Further, the display control unit 11 generates, for each pixel, a series of pixel data PD representing the luminance level of that pixel based on the video signal VS. Then, the display control unit 11 converts a video digital data signal including the series of pixel data PD, a clock signal CLK having a unit cycle 1UI of a serial signal for one pixel data PD, and a synchronization signal into a group compliant with the LVDS (Low Voltage (Differential Signaling) standard, for example.

That is, the display control unit 11 generates a differential data signal DFD, obtained by converting the series of pixel data PD and the synchronization signal into the form of a serial differential signal. Further, the display control unit 11 generates a differential clock signal DFC by making the clock signal CLK into differential signal. Then, the display control unit 11 transmits the differential clock signal DFC and the differential data signal DFD to the data driver 13.

The scan driver 12 generates a horizontal scan pulse having a predetermined peak voltage in synchronization with the horizontal scan signal HS, and sequentially and selectively applies it to each of the scan lines GL1 to GLm of the display panel 20.

The data driver 13 receives the differential data signal DFD and the differential clock signal DFC. Based on the differential data signal DFD and the differential clock signal DFC, the data driver 13 generates analog driving signals G1 to Gn respectively corresponding to the data lines DL1 to DLn of the display panel 20, and supplies them to the data lines DL1 to DLn of the display panel 20.

Figure 2:
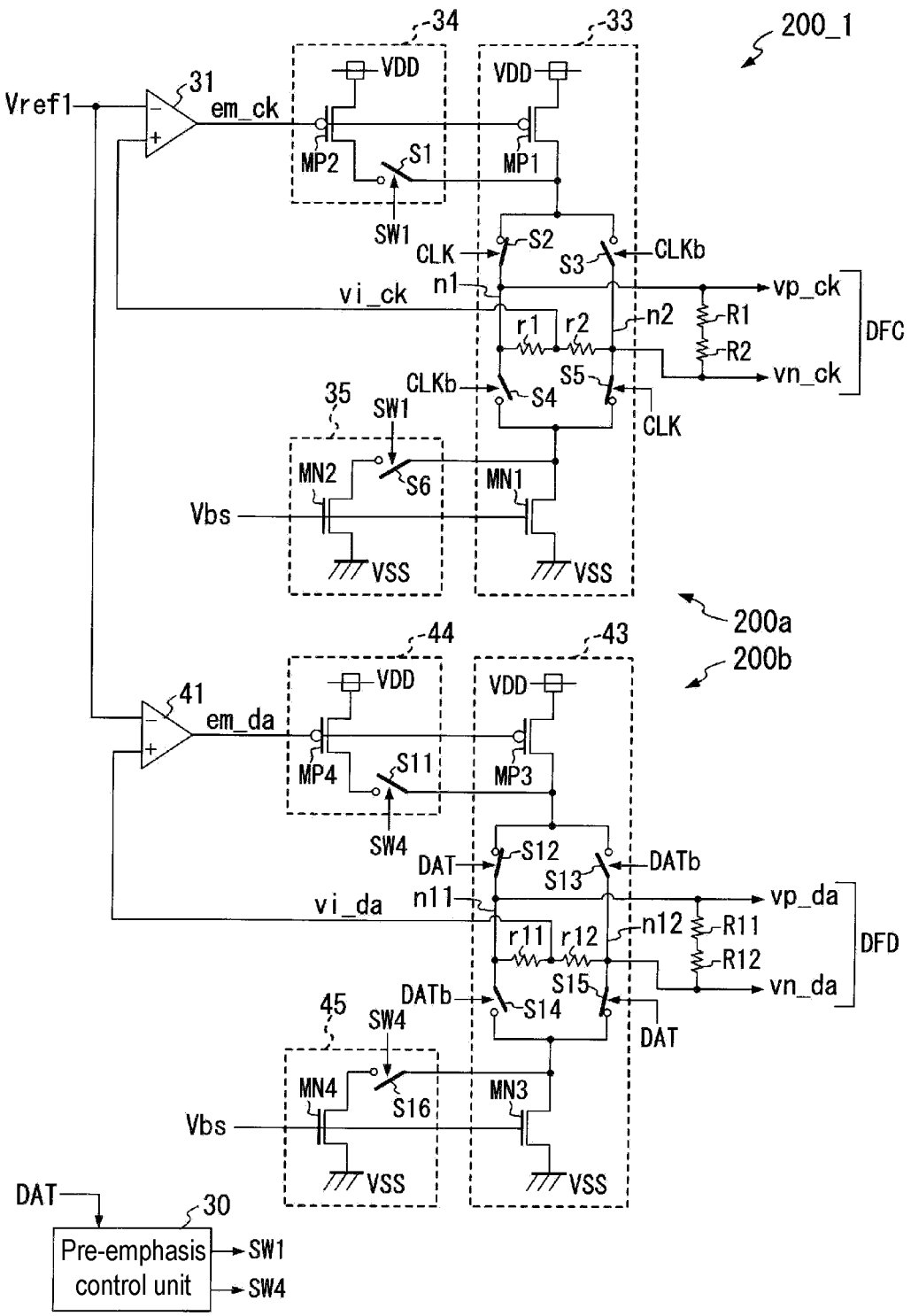
FIG. 2 is a circuit diagram showing the configuration of an output driver 200_1 as a first embodiment of the disclosure.

FIG. 2 is a circuit diagram showing the configuration of an output driver 200_1 included in the display control unit 11, which generates the differential data signal DFD and the differential clock signal DFC and supplies each to the data driver 13.

The output driver 200_1 includes a clock driver part 200a, a data driver part 200b, and pre-emphasis control unit 30.

Moreover, the clock driver part 200a receives the clock signal CLK and an inverted clock signal CLKb obtained by logically inverting the clock signal CLK. Thereby, the clock driver part 200a generates the differential clock signal DFC including a positive differential clock signal vp_ck and a negative differential clock signal vn_ck, obtained by making the clock signal CLK into differential signal. The data driver part 200b receives a digital data signal DAT representing the series of pixel data PD and the synchronization signal, and an inverted digital data signal DATb obtained by logically inverting the digital data signal DAT. Thereby, the data driver part 200b generates the differential data signal DFD including a positive differential data signal vp_da and a negative differential data signal vn_da, obtained by making the digital data signal DAT and the inverted digital data signal DATb into differential signals.

As shown in FIG. 2, the clock driver part 200a includes an operational amplifier 31, a differential signaling circuit 33, pre-emphasis circuits 34 and 35, and terminating resistors R1 and R2.

The operational amplifier 31 receives a common mode voltage vi_ck detected by the differential signaling circuit 33 at its non-inverting input terminal, and receives a predetermined reference voltage Vref1 at its inverting input terminal. The operational amplifier 31 generates a differential voltage em_ck representing a difference between the common mode voltage vi_ck and the reference voltage Vref1, and outputs it to the differential signaling circuit 33 and the pre-emphasis circuit 34.

The differential signaling circuit 33 includes a P-channel MOS transistor MP1, an N-channel MOS transistor MN1, switch elements S2 to S5, and resistors r1 and r2.

The transistor MP1 receives a power supply voltage VDD at its own source, and receives the differential voltage em_ck at its own gate. A drain of the transistor MP1 is connected to one end of each of the switch elements S2 and S3. Thereby, the transistor MP1 generates a current having a current value based on the differential voltage em_ck as a bias current, and sends to one end of each of the switch elements S2 and S3.

The other end of a switch element S2 is connected to one end of the resistor r1 and one end of a switch element S4 via a node n1. The other end of the resistor r1 is connected to one end of the resistor r2 and the non-inverting input terminal of the operational amplifier 31.

The switch element S2 receives the clock signal CLK, and becomes OFF state while the clock signal CLK is at logic level 0, for example. On the other hand, while the clock signal CLK is at logic level 1, the switch element S2 becomes ON state, electrically connecting the drain of the transistor MIP and the node n1.

The other end of a switch element S3 is connected to the other end of the resistor r2 and one end of a switch element S5 via a node n2. The switch element S3 receives the inverted clock signal CLKb, and becomes OFF state while the inverted clock signal CLKb is at logic level 0, for example. On the other hand, while the inverted clock signal CLKb is at logic level 1, the switch element S3 becomes ON state, electrically connecting the drain of the transistor MP1 and the node n2.

The other end of the switch element S4 is connected to a drain of the transistor MN1. The switch element S4 receives the inverted clock signal CLKb, and becomes OFF state while the inverted clock signal CLKb is at logic level 0, for example. On the other hand, while the inverted clock signal CLKb is at logic level 1, the switch element S4 becomes ON state, electrically connecting the node n1 and the drain of the transistor MN1.

The other end of the switch element S5 is connected to the drain of the transistor MN1. The switch element S5 receives the clock signal CLK, and becomes OFF state while the clock signal CLK is at logic level 0, for example. On the other hand, while the clock signal CLK is at logic level 1, the switch element S5 becomes ON state, electrically connecting the node n2 and the drain of the transistor MN1.

Here, a voltage generated at a connection point between the resistors r1 and r2 is supplied to the non-inverting input terminal of the operational amplifier 31 as the common mode voltage vi_ck.

The terminating resistors R1 and R2 connected in series are connected between the node n1 and the node n2. That is, one end of the terminating resistor R1 is connected to the node n1, and one end of the terminating resistor R2 is connected to the node n2. Further, the other ends of the terminating resistors R1 and R2 are connected to each other.

At this time, the voltage generated at the node n1 is output as the positive differential clock signal vp_ck, and the voltage generated at the node n2 is output as the negative differential clock signal vn_ck.

The transistor MN1 receives a ground voltage VSS at its own source, and receives a bias voltage Vbs having a predetermined fixed voltage value at its own gate. Thereby, the transistor MN1 allows a current to flow based on the bias voltage Vbs.

The pre-emphasis circuit 34 includes a P-channel MOS transistor MP2 and a switch element S1. The transistor MP2 receives the power supply voltage VDD at its own source, and receives the differential voltage em_ck at its own gate. A drain of the transistor MP2 is connected to one end of the switch element S1. The other end of the switch element S1 is connected to the drain of the transistor MP1. The switch element S1 receives a pre-emphasis signal SW1 from the pre-emphasis control unit 30, and becomes OFF state while the pre-emphasis signal SW1 is at logic level 0, for example.

On the other hand, while the pre-emphasis signal SW1 is at logic level 1 instructing execution of pre-emphasis, the switch element S1 becomes ON state, connecting the drain of the transistor MP2 and the drain of the transistor MP1.

With such a configuration, in response to the pre-emphasis signal SW1 of logic level 1 instructing execution of pre-emphasis, the pre-emphasis circuit 34 generates a current having a current value based on the differential voltage em_ck as a pre-emphasis current. Then, the pre-emphasis circuit 34 adds the pre-emphasis current to the bias current sent out by the transistor MP of the differential signaling circuit 33.

The pre-emphasis circuit 35 includes an N-channel MOS transistor MN2 and a switch element S6. The transistor MN2 receives the ground voltage VSS at its own source, and receives the bias voltage Vbs at its own gate. A drain of the transistor MN2 is connected to one end of the switch element S6. The other end of the switch element S6 is connected to the drain of the transistor MN1. The switch element S6 receives a pre-emphasis signal SW4 from the pre-emphasis control unit 30, and becomes OFF state while the pre-emphasis signal SW4 is at logic level 0, for example. On the other hand, while the pre-emphasis signal SW4 is at logic level 1, the switch element S6 becomes ON state, connecting the drain of the transistor MN2 and the drain of the transistor MN1.

With such a configuration, in response to the pre-emphasis signal SW1 of logic level 1 instructing execution of pre-emphasis, the pre-emphasis circuit 35 extracts a fixed pre-emphasis current based on the bias voltage Vbs from the drain of the transistor MN1 of the differential signaling circuit 33.

As shown in FIG. 2, the data driver part 200b includes an operational amplifier 41, a differential signaling circuit 43, pre-emphasis circuits 44 and 45, and terminating resistors R11 and R12.

The operational amplifier 41 receives a common mode voltage vi_da detected by the differential signaling circuit 43 at its non-inverting input terminal, and receives the reference voltage Vref1 at its inverting input terminal. The operational amplifier 41 generates a differential voltage em_da representing a difference between the common mode voltage vi_da and the reference voltage Vref1, and outputs it to the differential signaling circuit 43 and the pre-emphasis circuit 44.

The differential signaling circuit 43 includes a P-channel MOS transistor MP3, an N-channel MOS transistor MN3, switch elements S12 to S15, and resistors r11 and r12.

The transistor MP3 receives the power supply voltage VDD at its own source, and receives the differential voltage em_da at its own gate. A drain of the transistor MP3 is connected to one end of each of the switch elements S12 and S13. Thereby, the transistor MP3 generates a current having a current value based on the differential voltage em_da as a bias current, and sends it to one end of each of the switch elements S12 and S13.

The other end of the switch element S12 is connected to one end of the resistor r11 and one end of a switch element S14 via a node n11. The other end of the resistor r11 is connected to one end of the resistor r12 and the non-inverting input terminal of the operational amplifier 41.

The switch element S12 receives the digital data signal DAT, and becomes OFF state while the digital data signal DAT is at logic level 0, for example. On the other hand, while the digital data signal DAT is at logic level 1, the switch element S12 becomes ON state, electrically connecting the drain of the transistor MP3 and the node n11.

The other end of a switch element S13 is connected to the other end of the resistor r12 and one end of a switch element S15 via a node n12. The switch element S13 receives the inverted digital data signal DATb, and becomes OFF state while the inverted digital data signal DATb is at logic level 0, for example. On the other hand, while the inverted digital data signal DATb is at logic level 1, the switch element S13 becomes ON state, electrically connecting the drain of the transistor MP3 and the node n12.

The other end of the switch element S14 is connected to a drain of the transistor MN3. The switch element S14 receives the inverted digital data signal DATb, and becomes OFF state while the inverted digital data signal DATb is at logic level 0, for example. On the other hand, while the inverted digital data signal DATb is at logic level 1, the switch element S14 becomes ON state, electrically connecting the node n11 and the drain of the transistor MN3.

The other end of the switch element S15 is connected to the drain of the transistor MN3. The switch element S15 receives the digital data signal DAT, and becomes OFF state while the digital data signal DAT is at logic level 0, for example. On the other hand, while the digital data signal DAT is at logic level 1, the switch element S15 becomes ON state, electrically connecting the node n12 and the drain of the transistor MN3.

Here, a voltage generated at a connection point between the resistors r11 and r12 is supplied to the non-inverting input terminal of the operational amplifier 41 as the common mode voltage vi_da.

The terminating resistors R11 and R12 connected in series are connected between the node n11 and the node n12. That is, one end of the terminating resistor R11 is connected to the node n11, and one end of the terminating resistor R12 is connected to the node n12. Further, the other ends of the terminating resistors R11 and R12 are connected to each other.

At this time, the voltage generated at the node n11 is output as the positive differential data signal vp_da, and the voltage generated at the node n12 is output as the negative differential data signal vn_da.

The transistor MN3 receives the ground voltage VSS at its own source, and receives the bias voltage Vbs at its own gate. Thereby, the transistor MN3 allows a current to flow based on the bias voltage Vbs.

The pre-emphasis circuit 44 includes a P-channel MOS transistor MP4 and a switch element S11. The transistor MP4 receives the power supply voltage VDD at its own source, and receives the differential voltage em_da at its own gate. A drain of the transistor MP4 is connected to one end of the switch element S11. The other end of the switch element S11 is connected to the drain of the transistor MP3. The switch element S11 receives the pre-emphasis signal SW4 from the pre-emphasis control unit 30, and becomes OFF state while the pre-emphasis signal SW4 is at logic level 0, for example. On the other hand, while the pre-emphasis signal SW4 is at logic level 1, the switch element S11 becomes ON state, connecting the drain of the transistor MP3 and the drain of the transistor MP4.

With such a configuration, in response to the pre-emphasis signal SW4 of logic level 1 instructing execution of pre-emphasis, the pre-emphasis circuit 44 generates a current having a current value based on the differential voltage em_da as a pre-emphasis current. Then, the pre-emphasis circuit 44 adds the pre-emphasis current to the bias current sent out by the transistor MP3 of the differential signaling circuit 43.

The pre-emphasis circuit 45 includes an N-channel MOS transistor MN4 and a switch element S16. The transistor MN4 receives the ground voltage VSS at its own source, and receives the bias voltage Vbs at its own gate. A drain of the transistor MN4 is connected to one end of the switch element S16. The other end of the switch element S16 is connected to the drain of the transistor MN3. The switch element S16 receives the pre-emphasis signal SW4 from the pre-emphasis control unit 30, and becomes OFF state while the pre-emphasis signal SW4 is at logic level 0, for example. On the other hand, while the pre-emphasis signal SW4 is at logic level 1, the switch element S16 becomes ON state, connecting the drain of the transistor MN4 and the drain of the transistor MN3.

With such a configuration, in response to the pre-emphasis signal SW4 of logic level 1 instructing execution of pre-emphasis, the pre-emphasis circuit 45 extracts a fixed pre-emphasis current based on the bias voltage Vbs from the drain of the transistor MN3 of the differential signaling circuit 43.

For each unit cycle 1UI of the serial signal for one pixel data PD, the pre-emphasis control unit 30 generates the pre-emphasis signal SW4 of logic level 1 within this unit cycle while the clock signal CLK changes from logic level 1 to logic level 0 or from logic level 0 to logic level 1. On the other hand, when the clock signal CLK remains at logic level 1 or 0 beyond the unit cycle 1UI, the pre-emphasis control unit 30 generates the pre-emphasis signal SW1 of logic level 0 instructing stop of the re-emphasis.

Moreover, since the cycle of the clock signal CLK is originally fixed at the unit cycle 1UI, the pre-emphasis control unit 30 supplies the pre-emphasis signal SW1 of logic level 1 instructing execution of pre-emphasis to the switch element S1 of the pre-emphasis circuit 34 and the switch element S6 of the pre-emphasis circuit 35.

Moreover, the pre-emphasis control unit 30 generates the pre-emphasis signal SW4 of logic level 1 instructing execution of pre-emphasis, or logic level 0 instructing stop of pre-emphasis based on the digital data signal DAT. That is, for each unit cycle 1UI, the pre-emphasis control unit 30 generates the pre-emphasis signal SW4 of logic level 1 instructing execution of pre-emphasis within this unit cycle while the logic level of the digital data signal DAT changes. On the other hand, when the digital data signal DAT remains at logic level 1 or 0 beyond the unit cycle 1UI, the pre-emphasis control unit 30 generates the pre-emphasis signal SW4 of logic level 0 instructing to stop pre-emphasis. Then, the pre-emphasis control unit 30 supplies the pre-emphasis signal SW4 to the switch element S11 of the pre-emphasis circuit 44 and the switch element S16 of the pre-emphasis circuit 45 included in the data driver part 200b.

The operation of the clock driver part 200a and the data driver part 200b included in the output driver 200_1 shown in FIG. 2 will be described below with reference to internal operating waveforms shown in FIG. 3.

[Operation of the Clock Driver Part 200a]

Figure 3:
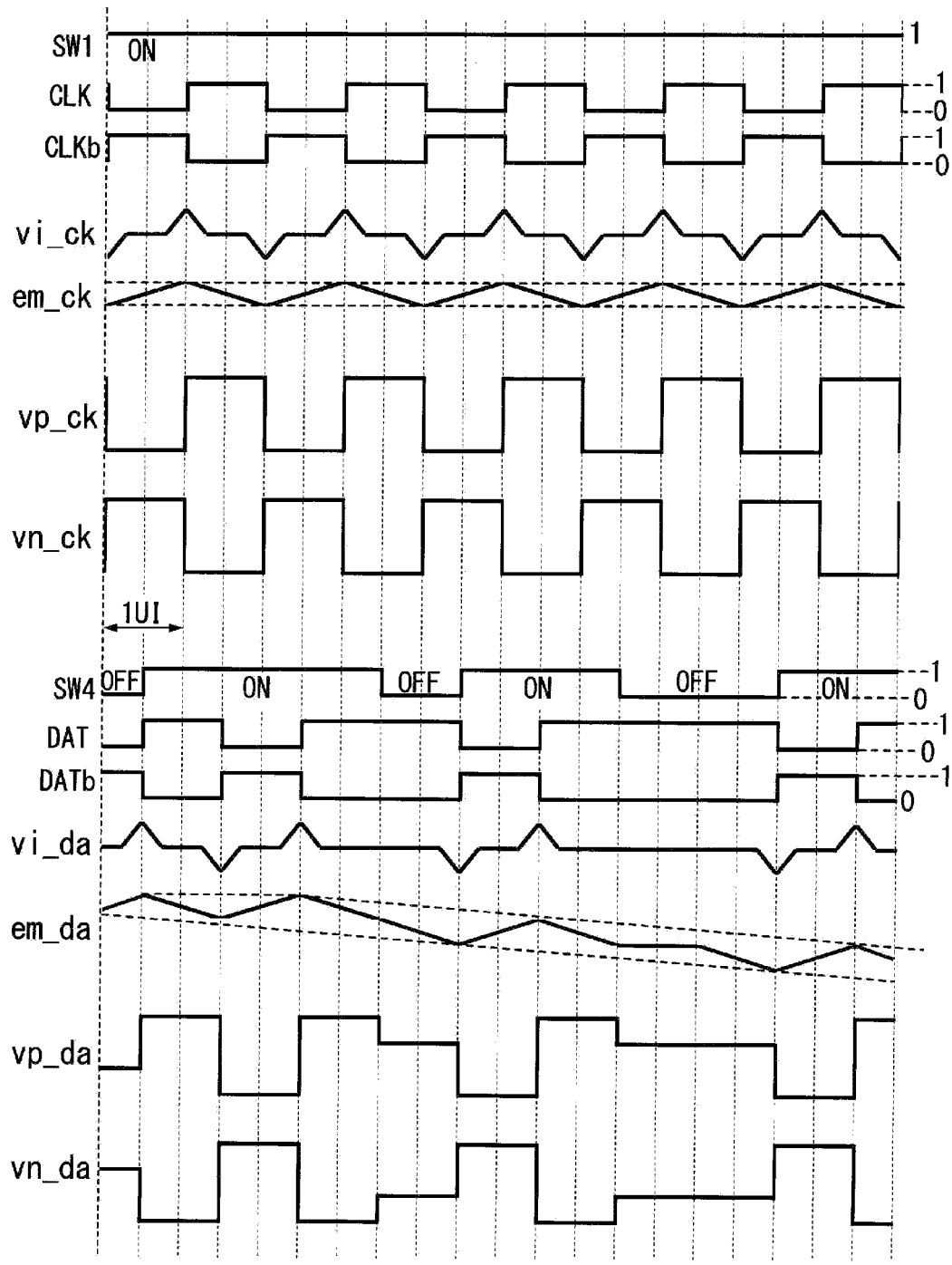
FIG. 3 is a time chart showing internal operating waveforms of the output driver 200_1.

In the clock driver part 200a, the differential signaling circuit 33 receives a clock signal CLK and an inverted clock signal CLKb which alternately alternate between logic levels 0 and 1 in the unit cycle 1UI, as shown in FIG. 3. Thus, while the clock signal CLK is at logic level 1, the bias current sent from the transistor MP1 based on the differential voltage em_ck as shown in FIG. 3 flows in a path including the switch element S2, the resistors r1 and r2, the switch element S5, and the transistor MN1. On the other hand, while the clock signal CLK is at logic level 0, that is, while the inverted clock signal CLKb is at logic level 1, the bias current based on the differential voltage em_ck flows in a path including the switch element S3, the resistors r2 and r1, the switch element S4, and the transistor MN1.

Thereby, as shown in FIG. 3, the positive differential data signal vp_da corresponding to the clock signal CLK and the negative differential data signal vn_da corresponding to the inverted clock signal CLKb are output. Moreover, the center voltages of the positive differential data signal vp_da and the negative differential data signal vn_da are supplied to the operational amplifier 31 as the common mode voltage vi_ck shown in FIG. 3. Thus, the operational amplifier 31 controls the bias current sent out from the transistor MP1 by the differential voltage em_ck such that the common mode voltage vi_ck becomes equal to the reference voltage Vref1.

Here, in the clock driver part 200a, as shown in FIG. 3, the switch element S1 of the pre-emphasis circuit 34 becomes ON state in response to the pre-emphasis signal SW1 of logic level 1 instructing execution of pre-emphasis. Thereby, the transistor MP2 of the pre-emphasis circuit 34 generates a pre-emphasis current based on the differential voltage em_ck shown in FIG. 3, and adds it to the bias current sent out from the transistor MP1 (pre-emphasis processing).

Thus, by the pre-emphasis processing of the pre-emphasis circuit 34, the bias current flowing in the differential signaling circuit 33 increases, thus the slew rate of the clock driver part 200a becomes higher. Further, the increase of the bias current makes it possible to follow the fluctuations of the common mode voltage vi_ck and quickly converge the voltage value of the common mode voltage vi_ck to the vicinity of the reference voltage Vref1.

[Operation of the Data Driver Part 200b]

In the data driver part 200b, the differential signaling circuit 43 receives the digital data signal DAT and the inverted digital data signal DAT of logic level 0 or logic level 1 corresponding to the content of the data, as shown in FIG. 3, for example. Thus, while the digital data signal DAT is at logic level 1, a bias current sent from the transistor MP3 based on the differential voltage em_da as shown in FIG. 3 flows in a path including the switch element S12, the resistors r11 and r12, the switch element S15, and the transistor MN3. On the other hand, while the digital data signal DAT is at logic level 0, that is, while the inverted digital data signal DATb is at logic level 1, the bias current based on the differential voltage em_da flows in a path including the switch element S13, the resistors r12 and r11, the switch element S14, and the transistor MN3.

Thereby, as shown in FIG. 3, the positive differential data signal vp_da corresponding to the digital data signal DAT and the negative differential data signal vn_da corresponding to the inverted digital data signal DATb are output. Moreover, the center voltages of the positive differential data signal vp_da and the negative differential data signal vn_da are supplied to the operational amplifier 41 as the common mode voltage vi_da shown in FIG. 3. Thus, the operational amplifier 41 controls the bias current sent out from the transistor MP3 by the differential voltage em_da such that the common mode voltage vi_da becomes equal to the reference voltage Vref1.

Here, in the data driver part 200b, as shown in FIG. 3, the switch element S11 of the pre-emphasis circuit 44 becomes ON state in response to the pre-emphasis signal SW4 of logic level 1 instructing execution of pre-emphasis. Thereby, the transistor MP4 of the pre-emphasis circuit 44 generates a pre-emphasis current based on the differential voltage em_da, and adds it to the bias current sent out from the transistor MP3 (pre-emphasis processing).

Thus, by the pre-emphasis processing by the pre-emphasis circuit 44, the bias current flowing through the differential signaling circuit 43 increases, thus the slew rate of the data driver part 200b becomes higher. Further, the increase of the bias current makes it possible to follow the fluctuations of the common mode voltage vi_da and quickly converge the voltage value of the common mode voltage vi_da to the vicinity of the reference voltage Vref1.

However, since the logic level of the digital data signal DAT changes randomly depending on the content of the data, the change cycle of the logic level is not constant.

Thereby, in the data driver part 200b, the pre-emphasis processing is stopped when the change cycle of the logic level of the digital data signal DAT becomes longer than the unit cycle 1UI, as shown in FIG. 3. Moreover, while the pre-emphasis processing is stopped, since the bias current is not increased by the pre-emphasis circuit 44, the differential voltage em_da gradually decreases as shown in FIG. 3.

Thus, when the output driver 2001 is required to further increase its speed, the operational amplifier 41 and the pre-emphasis circuit 44 cannot follow changes in the common mode voltage vi_da as shown in FIG. 3. Thus, a problem arises in that fluctuations in the common mode voltage, which is the center voltage of the positive differential data signal vp_da and the negative differential data signal vn_da, cannot be suppressed.

Embodiment 2

Figure 4:
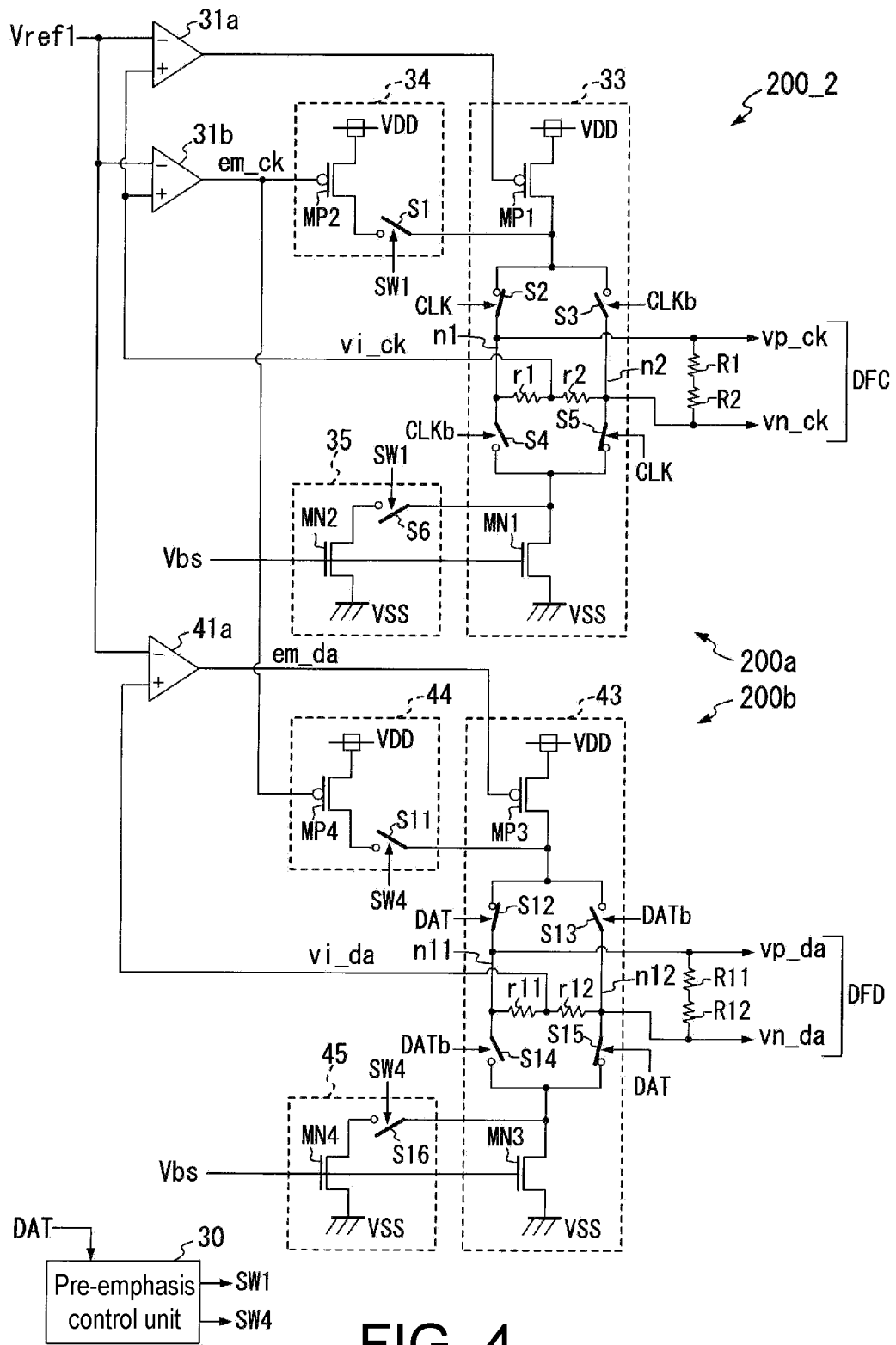
FIG. 4 is a circuit diagram showing the configuration of an output driver 200_2 as a second embodiment of the disclosure.

FIG. 4 is a circuit diagram showing the configuration of an output driver 200_2 as a second embodiment of the disclosure.

Moreover, in the configuration of the output driver 200_2 shown in FIG. 4, the other configurations are the same as that shown in FIG. 1, except that operational amplifiers 31a and 31b are used instead of the operational amplifier 31, and an operational amplifier 41a is used instead of the operational amplifier 41.

In FIG. 4, the operational amplifier 31a of the clock driver part 200a receives the common mode voltage vi_ck detected by the differential signaling circuit 33 at the non-inverting input terminal, and receives the reference voltage Vref1 at the inverting input terminal. The operational amplifier 31a generates a differential voltage representing the difference between the common mode voltage vi_ck and the reference voltage Vref1, and supplies it to the gate of the transistor MP1 of the differential signaling circuit 33.

The operational amplifier 31b receives the common mode voltage vi_ck at the non-inverting input terminal, and receives the reference voltage Vref1 at the inverting input terminal. The operational amplifier 31b generates the differential voltage em_ck representing the difference between the common mode voltage vi_ck and the reference voltage Vref1. The operational amplifier 31b supplies the generated differential voltage em_ck to the gate of the transistor MP2 of the pre-emphasis circuit 34 and the gate of the transistor MP4 of the pre-emphasis circuit 44 of the data driver part 200b.

The operational amplifier 41a of the data driver part 200b receives the common mode voltage vi_da detected by the differential signaling circuit 43 at the non-inverting input terminal, and receives the reference voltage Vref1 at the inverting input terminal. The operational amplifier 41a generates the differential voltage em_da representing the difference between the common mode voltage vi_da and the reference voltage Vref1, and supplies it to the gate of the transistor MP3 of the differential signaling circuit 43.

That is, in the output driver 200_2, each of the operational amplifiers 31a and 31b generates a differential voltage representing the difference between the reference voltage Vref1 and the common mode voltage vi_ck. Here, the differential voltage generated by the operational amplifier 31a is supplied only to the transistor MP1 among the transistor MP1 of the differential signaling circuit 33 and the transistor MP2 of the pre-emphasis circuit 34. Moreover, the differential voltage representing the difference between the reference voltage Vref1 generated by the operational amplifier 41a and the common mode voltage vi_da on the data driver part 200b side is supplied only to the transistor MP3 among the transistor MP3 of the differential signaling circuit 43 and the transistor MP4 of the pre-emphasis circuit 44. Then, the differential voltage generated by the operational amplifier 31b is supplied to the gate of the transistor MP2 in the pre-emphasis circuit 34 of the clock driver part 200a, and to the gate of the transistor MP4 in the pre-emphasis circuit 44 of the data driver part 200b.

Moreover, the configuration of the differential signaling circuits 33 and 43, the pre-emphasis circuits 34, 35, 44 and 45, and the terminating resistors R1, R2, R11 and R12 included in the output driver 2002 shown in FIG. 4 are the same as those shown in FIG. 1, respectively, and their operating waveforms are also similar to those shown in FIG. 3.

However, in the output driver 200_2, the pre-emphasis circuit 34 on the clock driver part 200a side and the pre-emphasis circuit 44 on the data driver part 200b side are driven by the differential voltage em_ck generated based on the common mode voltage vi_ck on the clock driver part 200a side. At this time, the differential voltage em_ck is generated based on the clock signal CLK whose change cycle of the logic level is fixed at the unit cycle 1UI, the amount of variation is smaller than that of the differential voltage em_da generated based on the digital data signal DAT whose change cycle of the logic level is not constant.

Thus, when the pre-emphasis circuit 44 executes a pre-emphasis processing, the pre-emphasis current for increasing the bias current sent out by the transistor MP4 can be kept constant. Thereby, the center voltage of the positive differential data signal vp_da and the negative differential data signal vn_da, namely the common mode voltage, can be made constant.

Embodiment 3

Figure 5:
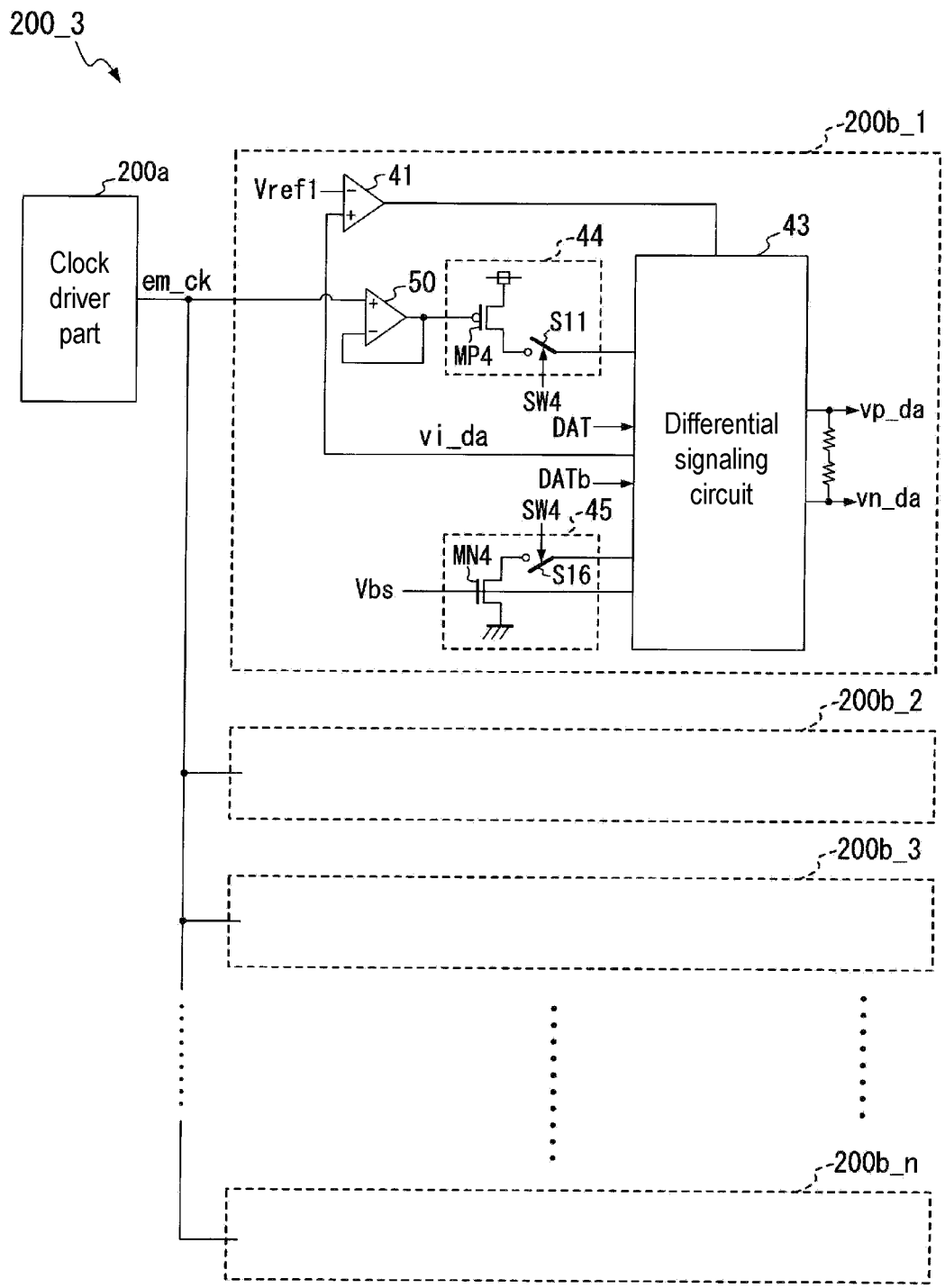
FIG. 5 is a block diagram showing the configuration of an output driver 200_3 as a third embodiment of the disclosure.

FIG. 5 is a block diagram showing the configuration of an output driver 200_3 as a third embodiment of the disclosure.

The output driver 200_3 includes one single clock driver part 200a and n systems of data driver parts 200b_1 to 200b_n.

Moreover, the clock driver part 200a shown in FIG. 5 is the same as the clock driver part 200a shown in the output driver 200_2 shown in FIG. 4. The clock driver part 200a supplies the differential voltage em_ck output from the operational amplifier 31b shown in FIG. 4 to each of the data driver parts 200b_1 to 200b_n.

Each of the data driver parts 200b_1 to 200b_n has the same configuration as the data driver part 200b shown in FIG. 4, except that a buffer amplifier 50 is newly added. The buffer amplifier 50 is a voltage follower with its own output terminal connected to an inverting input terminal, it receives the differential voltage em_ck at its own non-inverting input terminal, and supplies a signal obtained by amplifying the differential voltage em_ck to the gate of the transistor MP4 of the pre-emphasis circuit 44.

In this manner, in the output driver 2003, the pre-emphasis circuit 44 of each of the multiple data driver parts 200b is controlled by the differential voltage em_ck generated by the single clock driver part 200a.

At this time, in the output driver 2003, the data driver parts 200b_1 to 200b_n receives the differential voltage parts em_ck sent out by the clock driver part 200a respectively via the buffer amplifier 50 provided therein. In other words, the buffer amplifier 50 separates the clock driver part 200a from each of the data driver parts 200b_1 to 200b_n. Thereby, it is possible to prevent the fluctuation of the feedback result caused by the operation of the data driver parts 200b_1 to 200b_n, that is, the fluctuation of the differential voltage representing the difference between the common mode voltage vi_da and the reference voltage Vref1, from propagating to the clock driver part 200a side.

Moreover, in the embodiment shown in FIGS. 2, 4, and 5, the pre-emphasis current on an N-channel MOS side (MN2, MN4) is fixed, and the pre-emphasis current on a P-channel MOS side (MP2, MP4) is adjusted by feedback. However, the pre-emphasis current on the P-channel MOS side may be fixed, and the pre-emphasis current on the N-channel MOS side may be adjusted by feedback.

Further, in the embodiments shown in FIGS. 2, 4, and 5, an example of a circuit that outputs the clock signal CLK and the digital data signal DAT respectively from the clock driver part 200a and the data driver part 200b, which are separate drivers, is described. However, by using the clock driver (200a) as a built-in replica circuit, the disclosure is also applicable to an embedded clock method in which a clock signal is embedded in a digital data signal.

Moreover, in this embodiment, an example of a circuit applied when the cycle (1UI) of the clock signal CLK is equal to or less than the cycle of the digital data signal is described, but the disclosure is also applicable to standards such as LVDS where the cycle of the clock signal is longer than the cycle of the digital data signal.

Further, in this embodiment, the clock signal (CLK) and the digital data signal (DAT) are used to be converted into differential signals, but the content of the input signal to be made into differential signal is not limited as long as it is a binary signal of logic level 0 or 1.

Moreover, although FIG. 2 or FIG. 4 shows the specific circuit configuration of the differential signaling circuits 33 and 43, the circuit configuration of the differential signaling circuit is not limited as long as it generates differential signals that are inverted in phase with each other on a pair of nodes (n1 and n2, or n11 and n12) by receiving a bias current.

In short, as the output driver (200_1 or 200_2) according to the disclosure, it is sufficient to include the following differential signaling circuit, differential voltage circuit, and pre-emphasis circuit.

The differential signaling circuit (33 or 43) includes a first transistor (MP1, MP3) that generates a bias current, first and second nodes (n1, n2 or n11, n12), and a resistance circuit (r1, r2 or r11, r12) connected between the first and second nodes. Here, the differential signaling circuit (33 or 43) outputs voltages generated at the first and second nodes as a pair of differential signals (vp_ck, vn_ck or vp_da, vn_da) by supplying the bias current to one of the first and second nodes based on the level (0, 1) of the input signal (CLK or DAT).

The differential voltage circuit (31, 31a, 31b, 41, or 41a) supplies a differential voltage (em_ck or em_da) representing a difference between the center voltage (vi_ck or vi_da) of the voltages between the first and second nodes and a predetermined reference voltage (Vref1) to the gate of the first transistor (MP1 or MP3).

In response to changes in the level (0, 1) of the input signal (DAT or CLK), the pre-emphasis circuit (34 or 44) performs a pre-emphasis processing, generating a current based on the differential voltage and adding it as a pre-emphasis current to the bias current.

Further, an output driver (200_2) according to the disclosure includes a clock driver part that outputs a clock signal (CLK) as a differential signal, and a data driver part that outputs a data signal (DAT) as a differential signal.

The clock driver part (200a) includes the following first differential signaling circuit, first and second operational amplifiers, and a first pre-emphasis circuit.

The first differential signaling circuit (33) includes the first transistor (MP1) that generates a first bias current, the first and second nodes (n1, n2), the first resistor (r1) with one end connected to the first node (n1), and the second resistor (r2) with one end connected to the second node (n2) and the other end connected to the other end of the first resistor. The first differential signaling circuit (33) outputs the voltages respectively generated at the first and second nodes as a pair of differential clock signals (vp_ck, vn_ck) by supplying the first bias current to one of the first and second nodes based on the level (0, 1) of the clock signal (CLK).

The first operational amplifier (31a) takes the voltage generated at the other end of the first resistor as a first center voltage (vi_ck) indicating the center voltage of the pair of differential clock signals, and supplies a differential voltage representing a difference between this first center voltage and the predetermined reference voltage (Vref1) to the gate of the first transistor (MP1).

The second operational amplifier (31b) generates a first differential voltage (em_ck) representing a difference between the first center voltage (vi_ck) and the reference voltage (Vref1).

The first pre-emphasis circuit (34) executes a pre-emphasis processing in response to changes in the level (0, 1) of the clock signal, generating a current (pre-emphasis current) based on the first differential voltage (em_ck) and adding it to the first added to the bias current.

The data driver part (200b) includes the following second differential signaling circuit, a third operational amplifier, and a second pre-emphasis circuit.

The second differential signaling circuit (43) includes the second transistor (MP3) that generates a second bias current, the third and fourth nodes (n3, n4), the third resistor (r11) with one end connected to the third node (n3), and the fourth resistor (r12) with one end connected to the fourth node (n4) and the other end connected to the other end of the third resistor. The second differential signaling circuit (43) outputs voltages respectively generated at the third and fourth nodes as a pair of differential data signals (vp_da, vn_da) by supplying the second bias current to one of the third and fourth nodes based on the level (0, 1) of the data signal (DAT).

The third operational amplifier (41a) takes the voltage generated at the other end of the third resistor (r11) as a second center voltage (vi_da) indicating the center voltage of the pair of differential data signals, and supplies a differential voltage representing a difference between this second center voltage and the reference voltage (Vref1) to the gate of the second transistor (MP3).

The second pre-emphasis circuit (44) executes a pre-emphasis processing in response to changes in the level (0, 1) of the data signal (DAT), generating a current (pre-emphasis current) based on the first differential voltage (em_ck) generated by the second operational amplifier (31b) of the clock driver part (200a) and adding it to the second bias current.

What is claimed is:

1. An output driver that makes a binary input signal into differential signal and outputs the same, the output driver comprising:
    a differential signaling circuit that comprises a first transistor that generates a bias current, a first node and a second node, and a resistor circuit connected between the first node and the second node, and outputs voltages generated respectively at the first node and the second node as a pair of differential signals by supplying the bias current to one of the first node and the second node based on a level of the input signal;
    a differential voltage circuit that supplies a differential voltage representing a difference between a center voltage of voltages between the first node and the second node and a predetermined reference voltage to a gate of the first transistor; and
    a pre-emphasis circuit that executes a pre-emphasis processing in response to changes in the level of the input signal, generating a current based on the differential voltage and adding it to the bias current,
    wherein the pre-emphasis circuit executes the pre-emphasis processing while the level of the input signal changes within a predetermined cycle, and stops the pre-emphasis processing when the level of the input signal remains constant beyond the predetermined cycle.

2. The output driver according to claim 1,
wherein the resistor circuit comprises:
    a first resistor, with one end connected to the first node; and
    a second resistor, with one end connected to the second node and the other end connected to the other end of the first resistor;
the differential signaling circuit comprises:
    a first switch element that receives the input signal, becomes ON or OFF state in response to the input signal, and supplies the bias current to the first node when it becomes ON state,
    a second switch element that receives an inverted input signal that inverts the level of the input signal, becomes ON or OFF state in response to the inverted input signal, and supplies the bias current to the second node when it becomes ON state; and
the differential voltage circuit comprises an operational amplifier that receives the reference voltage and receives a voltage generated at the other end of the first resistor as the center voltage, and generates a difference between the reference voltage and the center voltage as the differential voltage, and
the pre-emphasis circuit comprises:
    a second transistor that receives the differential voltage at its own gate, and
    a switch element that executes the pre-emphasis processing by connecting a drain of the second transistor to a drain of the first transistor when in ON state, and stops the pre-emphasis processing by disconnecting the drain of the second transistor from the drain of the first transistor when in OFF state.

3. An output driver comprising: a clock driver part that makes a clock signal into differential signal and outputs the same, and a data driver part that makes a data signal into differential signal and outputs the same,
    wherein the clock driver part comprises:

a first differential signaling circuit that comprises a first transistor that generates a first bias current, a first node and a second node, a first resistor with one end connected to the first node, and a second resistor with one end connected to the second node and the other end connected to the other end of the first resistor, and outputs voltages generated respectively at the first node and the second node as a pair of differential clock signals by supplying the first bias current to one of the first node and the second node based on a level of the clock signal;

a first operational amplifier that takes a voltage generated at the other end of the first resistor as a first center voltage indicating a center voltage of the pair of differential clock signals, and supplies a differential voltage representing a difference between the first center voltage and a predetermined reference voltage to a gate of the first transistor;

a second operational amplifier that generates a first differential voltage representing a difference between the first center voltage and the reference voltage; and a first pre-emphasis circuit that executes a pre-emphasis processing in response to changes in a level of the clock signal, generating a current based on the first differential voltage and adding it to the first bias current, and the data driver part comprises:

a second differential signaling circuit that comprises a second transistor that generates a second bias current, third and fourth nodes, a third resistor with one end connected to the third node, and a fourth resistor with one end connected to the fourth node and the other end connected to the other end of the third resistor, and outputs voltages generated respectively at the third and fourth nodes as a pair of differential data signals by supplying the second bias current to one of the third and fourth nodes based on the level of the data signal;

a third operational amplifier that take a voltage generated at the other end of the third resistor as a second center voltage indicating a center voltage of the pair of differential data signals, and supplies a differential voltage representing a difference between the second center voltage and the reference voltage to a gate of the second transistor; and a second pre-emphasis circuit that executes a pre-emphasis processing in response to changes in a level of the data signal, generating a current based on the first differential voltage and adding it to the second bias current.

4. The output driver according to claim 3, wherein the first pre-emphasis circuit executes the pre-emphasis processing throughout a period during which the level of the clock signal changes at a predetermined cycle; and the second pre-emphasis circuit executes the pre-emphasis processing while the level of the data signal changes within the predetermined cycle, and stops the pre-emphasis processing when the level of the data signal remains constant beyond the predetermined cycle.

5. A display device, comprising:

a display panel comprising a plurality of data lines for image display;

a display control unit that receives a video signal, generates a pair of differential data signals obtained by making a series of pixel data pieces representing a luminance level of each pixel based on the video signal into differential signal and each comprising a pair of differential signals, and a pair of differential clock signals obtained by making a clock signal into differential signal, and outputs them respectively; and a data driver that receives the pair of differential data signals and the pair of differential clock signals, generates a plurality of driving signals based on the pair of differential data signals and the pair of differential clock signals, and supplies them to the plurality of data lines of the display panel, wherein the display control unit generates the pair of differential clock signals by the clock driver part according to claim 3 and generates the pair of differential data signals by the data driver part according to claim 3.

* * * * *